(12) United States Patent
Sanders

(10) Patent No.: US 6,892,751 B2
(45) Date of Patent: May 17, 2005

(54) SYSTEM AND METHOD FOR PROTECTING A BUILDING

(76) Inventor: Mark Sanders, 3863 Willow Rd., Zionsville, IN (US) 46077

( * ) Notice: Subject to any disclaimer, the term of this patent is extended or adjusted under 35 U.S.C. 154(b) by 236 days.

(21) Appl. No.: 10/085,339

(22) Filed: Feb. 28, 2002

(65) Prior Publication Data

US 2003/159732 A1 Aug. 28, 2003

(51) Int. Cl.$^7$ .......................... G08B 21/00; G08B 21/20
(52) U.S. Cl. .................... 137/312; 137/79; 307/118; 340/605; 361/178; 700/282; 702/51
(58) Field of Search .................. 137/79, 312; 307/118; 361/178; 700/282; 702/51; 340/604, 605

(56) References Cited

U.S. PATENT DOCUMENTS

| | | | |
|---|---|---|---|
| 1,585,816 A | | 11/1926 | Atherton |
| 4,911,200 A | | 3/1990 | Ben-Arie |
| 5,004,014 A | | 4/1991 | Bender |
| 5,090,436 A | | 2/1992 | Hoch et al. |
| 5,248,124 A | | 9/1993 | Nugent |
| 5,557,263 A | * | 9/1996 | Fisher et al. ................. 340/605 |
| 5,655,561 A | | 9/1997 | Wendel et al. |
| 5,908,980 A | * | 6/1999 | Hwang et al. ............... 340/605 |
| 6,147,613 A | * | 11/2000 | Doumit ........................ 137/312 |
| 6,182,497 B1 | * | 2/2001 | Krajci ......................... 340/605 |
| 6,186,162 B1 | | 2/2001 | Purvis et al. |
| 6,232,883 B1 | | 5/2001 | Silva et al. |
| 6,323,774 B1 | * | 11/2001 | Mitchell ...................... 340/605 |
| 6,489,895 B1 | * | 12/2002 | Apelman ..................... 340/605 |
| 6,552,647 B1 | * | 4/2003 | Thiessen et al. ............. 340/605 |

OTHER PUBLICATIONS

WaterCop, Informational article, www.watercop.com/watercop/details_needs.asp?reseller=.

* cited by examiner

Primary Examiner—George L. Walton
(74) Attorney, Agent, or Firm—Maginot, Moore & Beck

(57) ABSTRACT

A building protection system includes a switch, a transmitter, a receiver and a controllable shut-off valve disposed within the inlet line of a utility, such as water or gas, provided to a building. The switch is used to close or open the shut-off valve to stop the flow of the utility into the building. The receiver is proximate the valve, while the transmitter and switch are remote from the valve. In one embodiment, the switch is a manual switch that can be used to generate a valve open or a valve closed signal. The switch and transmitter can be wall-mounted, such as in a garage, or can be integrated into a hand-held device, such as a remote control. In other embodiments, the switch is associated with a condition sensor, such as for sensing a utilities leak or for sensing a temperature outside a certain pre-determined limit value. In still further embodiments, the building protection system includes an auto-dialer for automatically dialing a pre-determined list of phone numbers in response to a sensed condition or in response to closing the utility shut-off valve.

16 Claims, 5 Drawing Sheets

SYSTEM AND METHOD FOR PROTECTING A BUILDING

BACKGROUND OF THE INVENTION

The present invention generally relates to systems and methods for protecting buildings such as residence or business structures, and more particularly, to systems and methods for protecting such buildings by enabling users to quickly and efficiently control utilities provided to the buildings, such as the flow of water or gas utilities.

Many residences and businesses are provided with public utilities, such as water and gas. These utilities are provided to the particular building continuously and under pressure through a main supply line. In most cases, these supply lines have an exterior shut-off valve that can be activated by the utility as necessary to terminate or suspend utility service to the building. In addition, the building may have a manual shutoff valve at the interior of the building. In a typical dwelling, the utilities shut-off valves are inconveniently situated within a crawl space or other difficult to access location.

Utilities leaks are a common source of damage to a building. Where the utility is natural gas, the ramifications of a leak can be disastrous, sometimes leading to an explosion. While water leaks are less ominous, they can be just as capable of ruining a building as a gas explosion. An unchecked water leak can flood a floor of a house, causing permanent water damage to the building structure, as well as to carpet or furniture within the house. In addition, the standing water leads to mildew that can cause permanent damage to parts of the house untouched by the water leak.

It has been estimated that a quarter million households have been severely damaged or ruined by unchecked and undetected water leaks. Payouts by insurance companies alone have been estimated to reach into the hundreds of millions of dollars annually for water leaks alone. While less prevalent, the damaging effects of gas leaks are also substantial when measured in terms of disrupted lives and the costs to repair or rebuild.

Many systems have been proposed to sense and address a utility leak at a particular leak site. For instance, it is known that washing machine hose failures and water heater ruptures are the most common causes of water leaks. Many systems are provided that can be associated with the particular appliance to sense a leak and shut of the supply of water to that appliance. Of course, one detriment of systems of this type is that each appliance must have its own system. Ideally, in a typical home, such a system would be provided for each toilet, each sink, the water heater, the washing machine and each outdoor faucet. For a business building, the number of monitored components can be even larger. It is easy to see that the cost of protecting every appliance or fixture can be prohibitive.

Some recent systems have been developed that shut off the entire water supply when a leak is detected. In systems of this type, a detector must be situated anywhere that a leak can be anticipated. As with the individual appliance shut off systems, master shut off systems of this type require a leak detector with every appliance or fixture. Another drawback of systems of this type is that they are responsive and not proactive. In other words, these systems only operate when a leak is detected and cannot be deliberately operated by the building occupant. In some instances, a water or gas leak may arise when the house or building is occupied. If the leak happens to arise where a detector is present, the occupant need not worry. However, if the leak occurs where no detector is present, the prior master shut-off systems are of no value, and may actually hinder the occupant's ability to manual shut-off the master supply valve.

A pro-active shut-off system can allow quick reaction by the building occupant when a gas or water leak is sensed. Even in the best case, an automatic sensing system requires that the leak occur long enough to be sensed. Of course, the leak is causing damage until it is finally detected and stopped. A pro-active system would allow the building occupant to stop the flow as quickly as possible before more significant damage occurs.

Moreover, a pro-active system would allow an occupant, such as a homeowner, to shut off the utility at will. For instance, when a homeowner leaves for an extended period of time, most utility companies recommend closing the master supply valve to the house. Since the master valves are usually inconveniently located, most homeowners either forget or elect not to close the supply valve.

Another aspect of a pro-active leak resolution system is the ability to notify the building owner of the existence of a leak, even if the leak has been automatically address by the system. For instance, some appliances may require a constant supply of the utility, be it water or gas, in order to operate. Moreover, some appliances and devices can be damaged if run "dry". Thus, it can be important that the building occupant or owner be informed as quickly as possible of the advent of a leak and ensuing automatic shut off.

In other cases, a pro-active system can notify the building owner in advance of a leak occurring. For instance, one common cause of water leaks is burst pipes due to freezing temperatures. It is well-known that water pipes adjacent exterior walls and exterior faucets are susceptible to freezing temperatures. These risks are greater when the building is unoccupied for an extended period, such as when a homeowner is away on a winter vacation. While an appliance or the water supply may not fail, the heating system for the house might. Obviously, without heat, the house temperature can easily drop below freezing, causing every water pipe in the house to burst. A pro-active system would alert someone to this potential danger.

What is needed, therefore, is a pro-active utility control system that allows direct interface and control by the homeowner or building occupant. In addition, the pro-active system would be operable to avoid conditions under which a leak is likely to arise.

SUMMARY OF THE INVENTION

The present invention contemplates a building protection system for controlling the flow of a utility, such as water or gas, through an inlet line into a building includes a valve disposed in the inlet line and having an open position permitting flow of the utility into the building and a closed position preventing flow of the utility into the building. The valve is responsive to an electrical signal to move between the open and the closed positions;

In one embodiment, the system includes a manual switch having a first state corresponding to the open position of the valve and a second state corresponding to the closed position of the valve. The switch is operable to generate a state signal corresponding to the state of the switch. The switch is connected to a wireless transmitter that is configured to generate a transmitted signal corresponding to the state signal of the switch. The switch and transmitter are remote from the valve, and can be incorporated into a wall-mounted switch or into a hand-held remote control.

The system further comprises a wireless receiver operably associated with the valve and configured to receive the transmitted signal and to generate the electrical signal in relation to the transmitted signal. Thus, when the receiver receives a particular signal, it either directs the valve to open or close. In one embodiment, the building occupant can depress one switch to deliberately close the master shut-off valve to terminate the flow of the utility into the building. Thus, the system provides an easy way for a homeowner, for instance, to automatically shut-off the water flow into a house when the homeowner intends to be away for an extended period.

In another feature of the invention, the building protection system includes a sensing switch connected to the transmitter and operable to generate a sensing signal in response to sensing a leak of the utility in the building. The sensing switch can be a water or gas sensing switch that generates a valve closing signal when a leak is detected. The sensing switch provides the sensing signal to the transmitter which then generates the transmitted signal for the receiver, which directs the valve to close accordingly. A plurality of such sensing switches connected to the transmitter can be provided throughout the building to sense a leak of the utility in proximity of the switch. The transmitter, then, is configured to generate the transmitted signal in response to receipt of one of the plurality of sensing signals.

In another feature of the invention, the building protection system can include an auto-dialer associated with the receiver and connected to a phone system. The auto-dialer is configured to automatically dial a stored phone number in response to receipt of the transmitted signal by the receiver, or in response to a valve close signal from the receiver to the valve. The auto-dialer can include a plurality of stored phone numbers that are automatically dialed in sequence when a condition arises requiring closing of the utility master shut-off valve. In one aspect, the auto-dialer can include a stored audio message informing of the alert condition.

In one embodiment of the invention, a temperature sensor can be situated in the building and operable to generate a control or sensing signal only when the building temperature falls outside a pre-determined range. More pertinently, the sensor can be calibrated to generate the control signal when the building temperature approaches freezing, thereby operating as an alert to the potential of the water pipes freezing. The temperature sensor can provide the sensing signal to an auto-dialer that issues a telephonic warning of the problem.

It is one important object of the invention to provides a system for protecting a building, such as a dwelling, from the ill-effects of a utility leak. A further object is achieved by the system's capability to address water and gas utilities. Another object resides in features of the invention that allow the building occupant or owner to take pro-active measures to avoid the potential for a utilities leak, such as by deliberately closing the utilities inlet line. Other objects and benefits of the invention will become apparent upon consideration of the following written description and accompanying figures.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
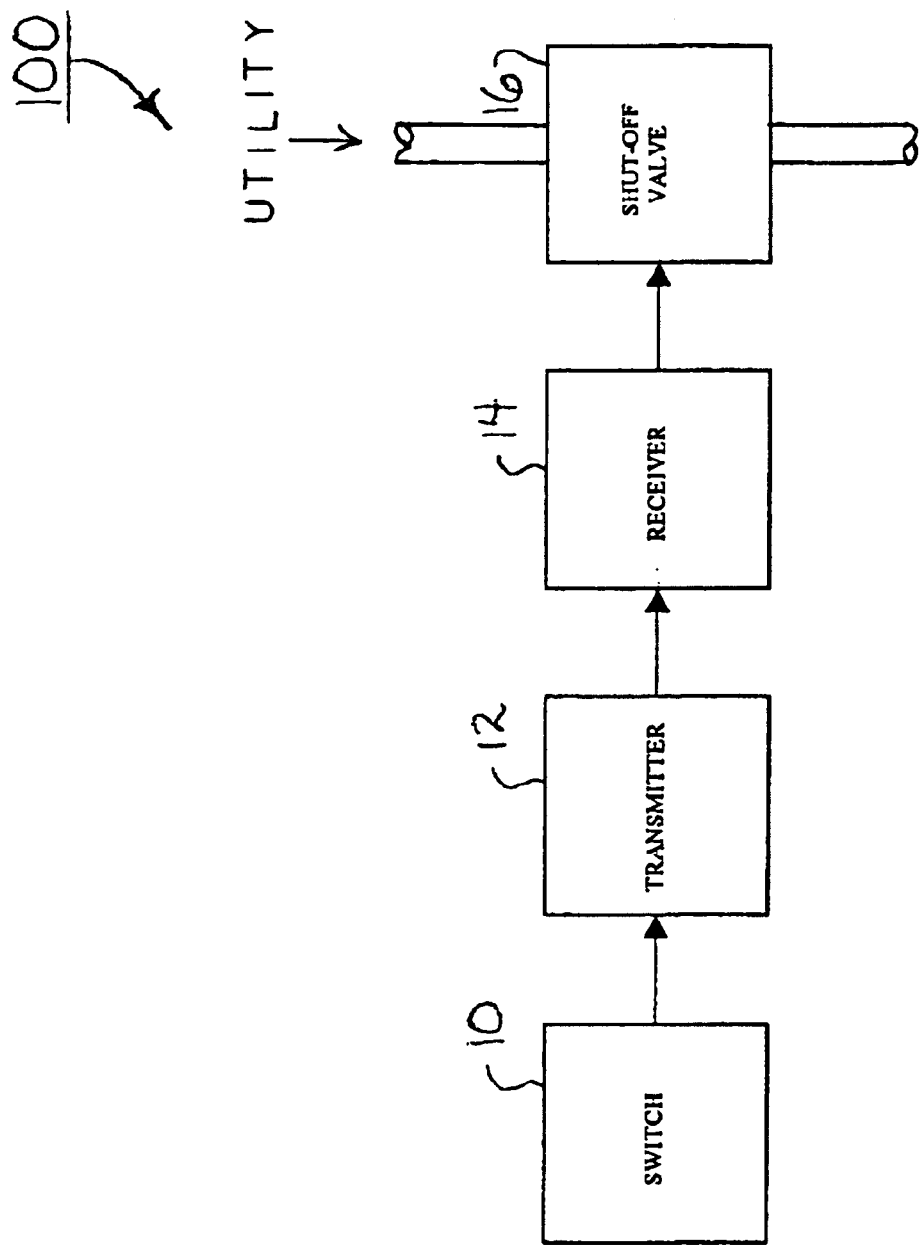
FIG. 1 is a block diagram of a first embodiment of a building protection system according to principles of the present invention.

The exemplifications set out herein illustrate preferred embodiments of the invention, and such exemplifications are not to be construed as limiting the scope of the invention in any manner.

DESCRIPTION OF THE PREFERRED EMBODIMENTS

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Referring now to FIG. 1, a block diagram of a first embodiment of a building protection system according to principles of the present invention is shown. In particular, FIG. 1 illustrates a building protection system 100 suitable for controlling the flow of a utility, such as water or gas, through an inlet line to a building, such as a residence or business structure. The system 100 of FIG. 1 comprises a switch 10, a transmitter 12, a receiver 14 and a controllable shut-off valve 16.

The switch 10 enables a user to control the flow of the utility, such as water or gas, to the building by manipulating the switch 10 to an "on" or "off" state. In particular, the "on" state of the switch 10 operates to permit the flow of the utility to the building, while the "off" state prohibits such flow. According to one exemplary design, the switch 10 may be embodied as a wall switch or the like which is positioned at a given location in the building. For instance, when the building is a house, the wall switch can be located in the garage, adjacent to but readily distinguishable from a garage door opener switch. One object of the invention is to provide a controllable utility master shut-off feature that is readily accessible. The garage location can be desirable for a residence scenario because the garage is likely the departure point for the residents. If the homeowner is taking a lengthy trip and intends to trigger the utility master shut-off, a garage location is convenient and can provide an immediate visual reminder to the homeowner.

The switch 10 thus generates a state signal corresponding to the "on" or "off" state of the switch. The transmitter 12 is operably associated with the switch 10 such that activation of the switch generates and transmits a signal indicative of the current state of the switch 10, or more particularly in relation to the state signal generated by the switch. The transmitter 12 is a wireless device that most preferably transmits a radio frequency (RF) signal. The "on"/"off" state of the switch can be represented by signal having a corresponding signal frequency, pulse width or magnitude. In a specific embodiment, the switch 10 and transmitter 12 can be in the form of a standard wireless garage door opener. While these two components can be combined into a wall-mounted unit, they can also be incorporated into a hand-held device akin to a remote garage or security door opener. In this manner, a user may remotely control the flow of water or gas from anywhere in the building. In a typical instance, the hand-held unit would have a transmission range limited to the vicinity of the building, again like a garage door opener. In this manner, the master shut-off switch 10/transmitter 12 combination can adhere to the transmission regulations for devices of this type. Alternatively, the transmitter can have a much greater range to allow remote activation of the system 100.

The system 100 includes a receiver 14 that is tuned to receive and translate the control signals transmitted from the transmitter 12. The wireless signal requires that the receiver 14 include an antenna or other signal receiving element to enable wireless reception of the control signal. The receiver 14 is located remotely from the transmitter 12 and switch 10. Most preferably, the receiver is immediately adjacent the shut-off valve 16, which is itself located at the main input line to the building. When the receiver 14 receives the control signal from the transmitter, it generates a control signal of its own in relation to the received control signal. This second control signal is transmitted to the shut-off valve 16 to determine its on/off or open/closed configuration.

Based on the second control signal, the valve 16 may open to permit the flow of the utility into the building, or close to prohibit such flow. In particular, when the second control signal indicates that the switch 10 is in the "on" state, the valve 16 can assume an open position to permit the flow of the material to the building. Alternatively, when the second control signal indicates that the switch 10 is in the "off" state, the valve 16 assumes a closed position to prohibit the flow of the material to the building.

The shut-off valve 16 can be of any type of conventional valve operable to open or close the input line for the water or gas utility. The valve 16 must include some form of powered actuator, such as a solenoid, for opening and closing the valve. In a preferred embodiment, a shut-off valve 16 for a water utility can be a rotatable ball valve connected to a rotational or rotary actuator. The valve and actuator can be a bi-state type valve with its own power source (or battery). Most preferably, the valve and actuator are positively moved between on/off or open/closed positions on receipt of an appropriate second control signal. In the case of the gas utility, the shut-off valve may be appropriately configured to produce a substantially leak-proof cessation of the gas flow into the building.

According to a preferred design, the receiver 14 and valve 16 may be operably coupled to one another via a tangible communication link, such as a wire, cable, fiber or other medium. With this design, the receiver 14 and valve 16 are preferably in close enough proximity to one another that a fixed or land-line communication link is feasible. It is also recognized that the receiver 14 and valve 16 may be embodied together as an integral unit.

Figure 2:
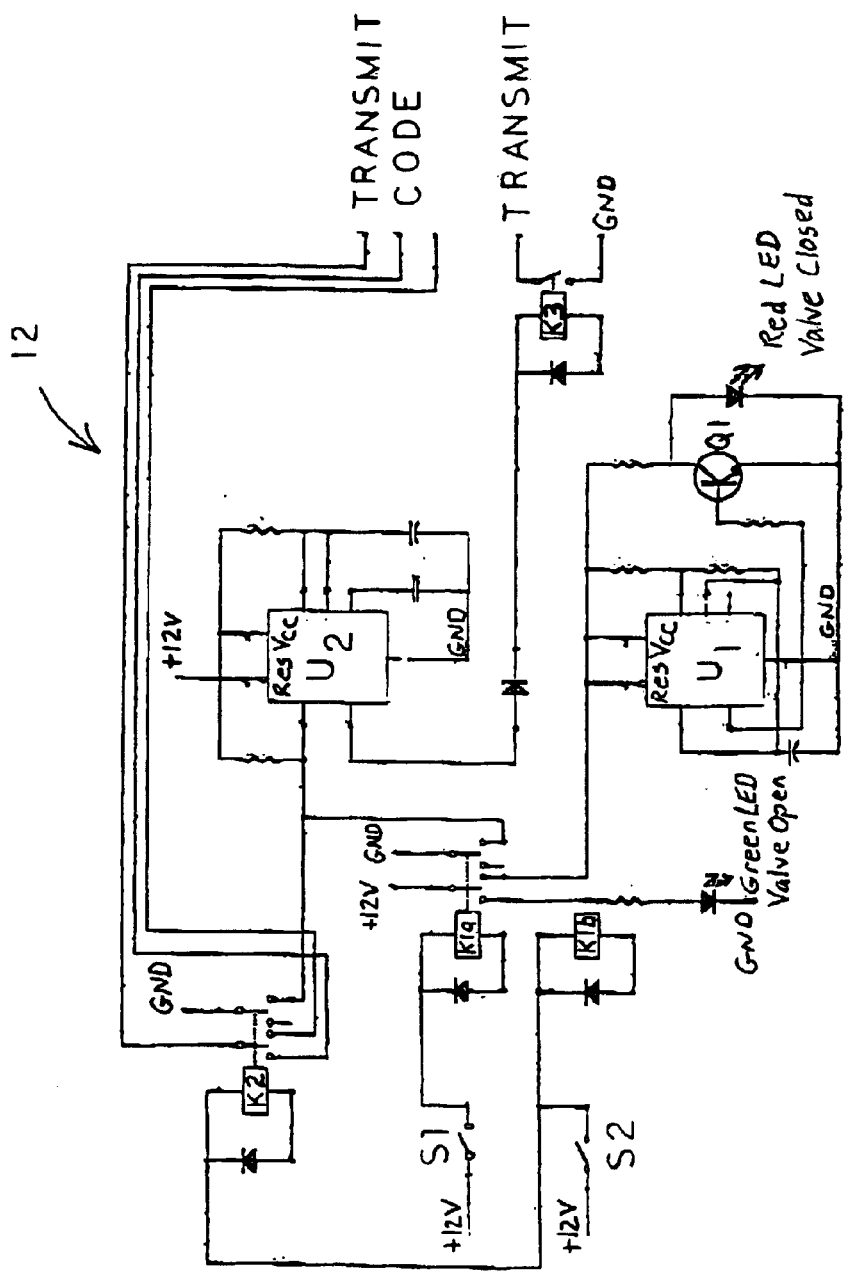
FIG. 2 is an electrical schematic of a transmitter circuit for use with the building protection system depicted in FIG. 1.
Figure 3:
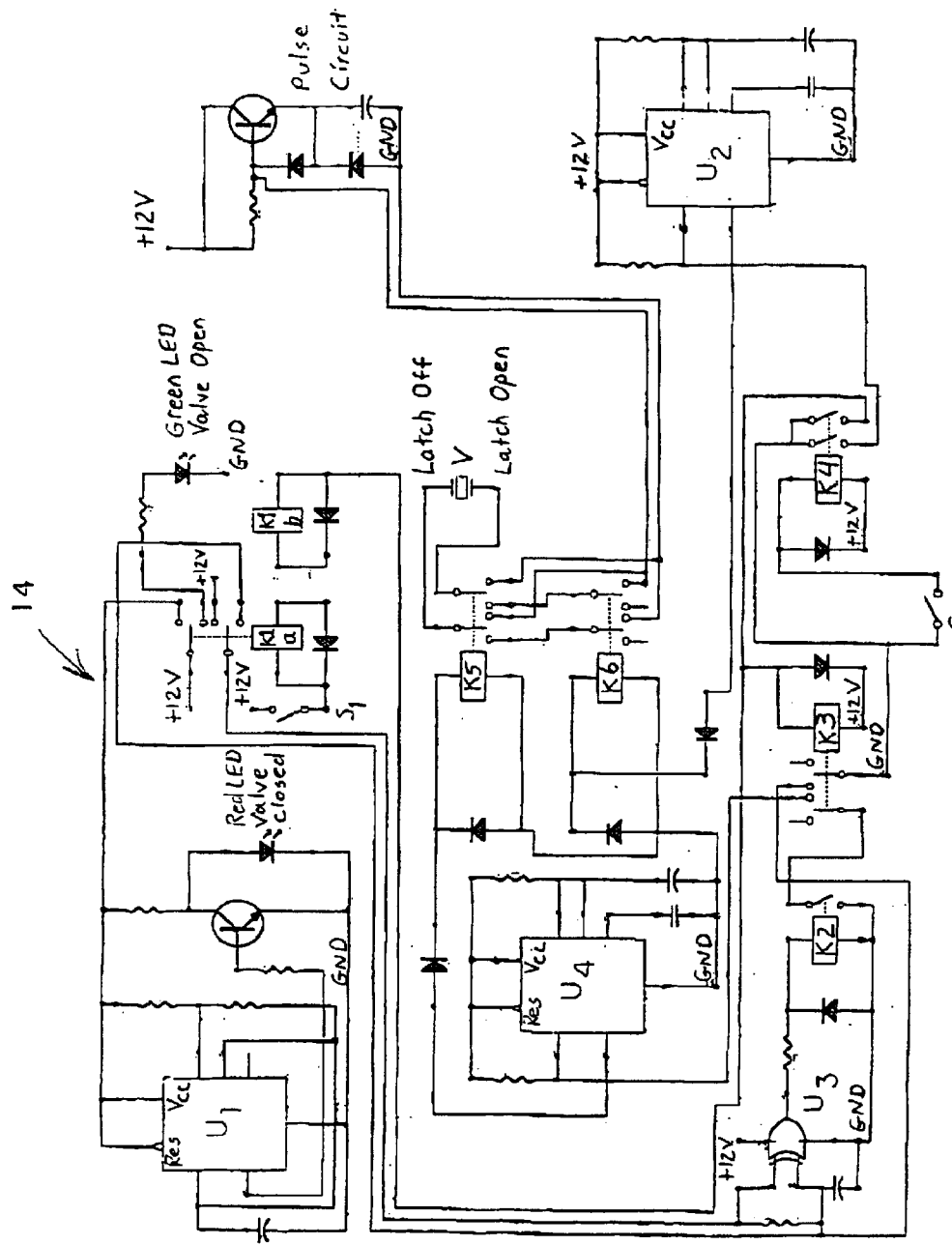
FIG. 3 is an electrical schematic of a receiver and latching valve circuit for use with the building protection system depicted in FIG. 1.

A preferred transmitter and receiver system is depicted in FIGS. 2 and 3. The circuit for the transmitter 12 is illustrated in FIG. 2 as including two user-operated switches S1, the valve closed switch, and S2, the valve open switch. In the normal condition, the main flow valve, or shut-off valve 16, is open to allow a flow of water or gas into the building. Thus, the green LED will be normally illuminated to signify that a valve open condition exists. When the valve closed switch 81 is depressed by the building occupant, power is provided to the relay K1a which strokes to disconnect the green LED from the +12V power supply and connect the power supply to the Vcc and reset inputs of a timer U1. The timer U1 pulses the red LED to provide a visual indication that a valve closed control signal is being transmitted. Preferably, this red LED remains illuminated until a valve open signal is transmitted.

Activation of the relay K1a also connects the Vcc and reset inputs of a second timer U2 to the power supply. This timer U2 pulses relay K3 which activates the transmitter to send the first control signal identifying a valve closed command.

Alternatively, the occupant may initiate opening the master shut-off valve by depressing the second switch S2. This activates the second relay K1b, which moves the power contacts in a direction opposite the motion imposed by the first relay K1a, thereby disconnecting the timer U1 from the power supply. This deactivates the red LED valve closed indicator and restores power to the green LED signifying a valve open condition. At the same time, power is provided to a relay K2 which changes the transmit code of the transmitter in accordance with the valve open command.

Regardless of which switch is depressed, the transmitter 12 sends a signal dependent upon the valve open or valve closed command. This signal is received and processed by the circuitry of the receiver 14 depicted in FIG. 3. In particular, the received signal determines which of the relays K1a or K1b is activated within the receiver circuit. For a valve open signal (corresponding to depressing switch S1 of the transmitter 12) switch S1 triggers the relay K1a which disconnects the green LED valve open indicator from the +12V power supply and connects the U1 timer to the supply. As with the transmitter, this timer flashes a red LED indicating a valve closed condition.

At the same time, activation of the relay K1a connects the timer U3 to the +12V supply. This timer outputs a pulse that closes the relay K2 for a sufficient period to start timer U4. This timer energizes the KS relay for a predetermined period, which can be about two seconds, sufficient to engage the 12-volt pulse circuit. This circuit is configured to produce a 30–50 ms 12-volt pulse that latches the valve V to the "off" position. This latching valve V can form part of the shut-off valve 16 of the system depicted in FIG. 1.

When the switch 10 and transmitter 12 are activated to produce a valve open, or reset, signal, the receiver switch S2 is closed, which energized the K4 relay. This relay activates the timer U2, which then energizes the relay K6 for a predetermined period to reverse the polarity of the signal from the pulse circuit. When the polarity is reversed, the 30–50 ms pulse shifts the valve to its latched "open" position. The activation of the K4 relay also activates the K3 relay to reset the U3 timer and disconnect the U4 timer from the U3 timer. Deactivation of the U4 timer prevents changing the state of the latching valve in the absence of a valve closed signal from the transmitter/receiver. The K4 relay also energizes the K1b relay to stop the timer U1, and consequently the red LED, and to simultaneously activate the green LED to indicate a "valve open" condition.

Figure 4:
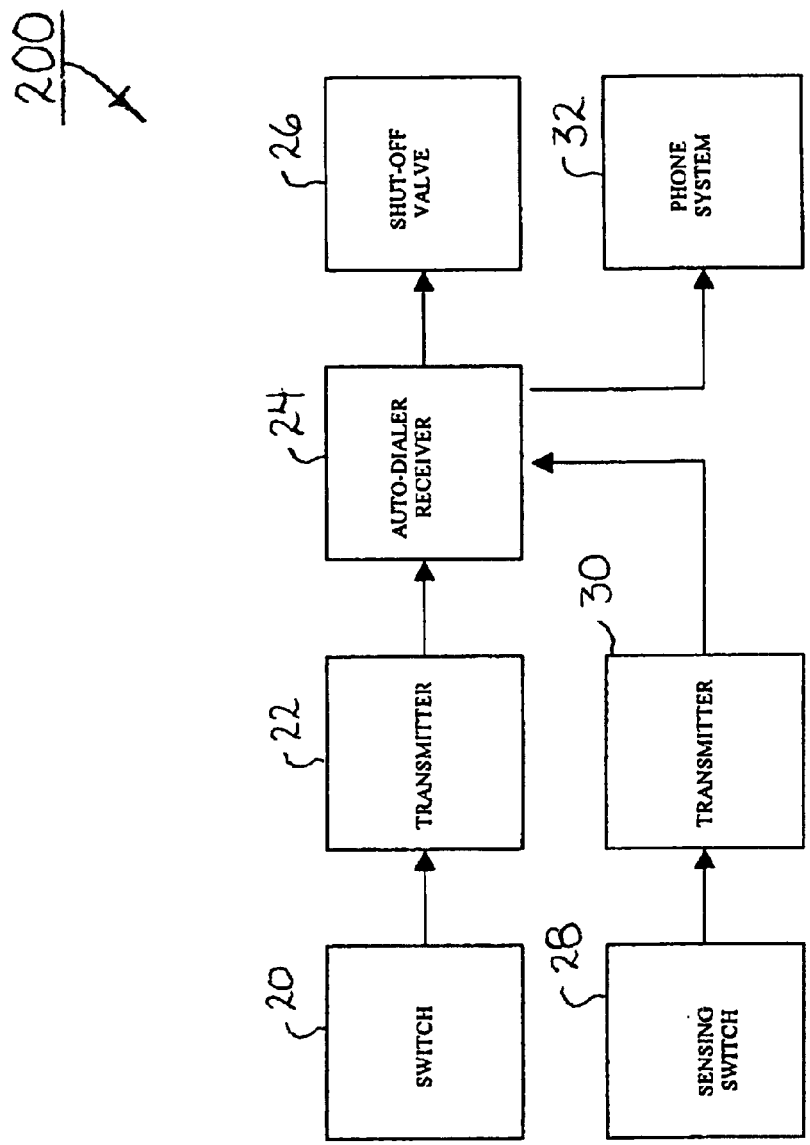
FIG. 4 is a block diagram of a second embodiment of a building protection system according to principles of the present invention.

Referring now to FIG. 4, a second embodiment of a building protection system according to principles of the present invention is shown. In particular, the embodiment of FIG. 4 is a variation of the first embodiment of FIG. 1. The building protection system 200 of FIG. 4 comprises a switch 20, a first transmitter 22, an auto-dialer receiver 24, a controllable shut-off valve 26, a water sensing switch 28, a second transmitter 30, and a phone system 32. Like the system 100 of FIG. 1, the system 200 of FIG. 2 also controls the flow of a utility, such as water or gas, to a building, such as a residence or business structure.

In addition to the capability for controlled shut-off of the master supply line to the building, the system 200 provides additional functions implemented by the auto-dialer receiver 24 and sensing switch 28. In one aspect of the invention, the sensing switch 28 can be configured to sense a leak condition in the particular utility. It is understood that the sensing switch can actually include a plurality of similar switches, preferably linked in parallel and connected to the transmitter 30.

For instance, the switch or switches 28 can be a natural gas sensor or even a smoke alarm. In this case, the system 200 would be implemented to provide a master shut-off of the gas utility into the building. In another instance, the switch 28 can be a number of water sensors disposed throughout the building. In a simple case, a single water sensor can be positioned in the basement of a house. In a more involved installation, water sensors can be associated with every device or appliance that has a water input. From the standpoint of the present invention, the particular sensors or sensing switches 28 operate similar to the manual switch 20 described above, except the switches 28 are single state switches. Thus, while the manual switch 20 allows the operator to deliberately open or close a shut-off valve, the sensing switches 28 only operate to send a valve closing signal. On the other hand, like the manual switch 20, the sensing switches 28 are connected to a transmitter 30 that transmits a control signal to the receiver 24.

The receiver 24 can be similar to the receiver 14 described above, and both the transmitter 22 and receiver 24 can include circuitry similar to that shown in FIGS. 2 and 3. However, with this embodiment, the receiver 24 also includes an auto-dialer feature. In particular, in addition to sending a valve control signal to the shut-off valve 26, the receiver 24 also sends dialing instructions to a phone system 32. This auto-dialer capability can be similar to the system used in alarm systems that automatically dial the alarm monitoring company.

This capability is modified with the present invention. In one feature, the auto-dialer receiver 24 can include a list of emergency phone numbers for the building owner/operator. The auto-dialer can place calls sequentially to each successive phone number until a reply is received by the auto-dialer. For instance, a homeowner may include the work number for the occupants, the cell phone number, or the number of a trusted friend. The auto-dialer can be configured to require an active response from the recipient of the emergency call, such as the receipt of a "pound sign" input from the dialed phone.

In another modification from the typical security alarm system, the auto-dialer receiver 24 can be configured to transmit a pre-recorded or voice synthesized message indicating the presence of an alarm condition. The message can be tailored to the particular utility involved—i.e., water or gas. The message can also indicate that the shut-off valve 26 has been activated to stop the flow of the utility into the building. The auto-dialer receiver 24 can be modified to transmit an e-mail or numeric pager message as well. The alert will allow the building owner to return to the building and address the leak condition. The system can permit user input of a series of contact numbers, including a temporary number for certain cases, such as when a homeowner is on vacation. The system can be configured to send the alarm message to all recipients or to stop sending once a reply has been received from a particular recipient. In the case of a gas utility, the auto-dialer receiver 24 can be hard-wired to always contact the gas utility when a gas leak is detected.

Since the system 200 integrates sensing switches 28 with a manual switch 20, the auto dialer receiver 24 can be configured to distinguish between a sensed condition and a manual input. For instance, if the homeowner activates the manual switch 20 to close the master water valve on the advent of a vacation trip, there is no need to transmit an alarm message to the homeowner. On the other hand, the auto-dial feature can be retained as a reminder and verification.

Figure 5:
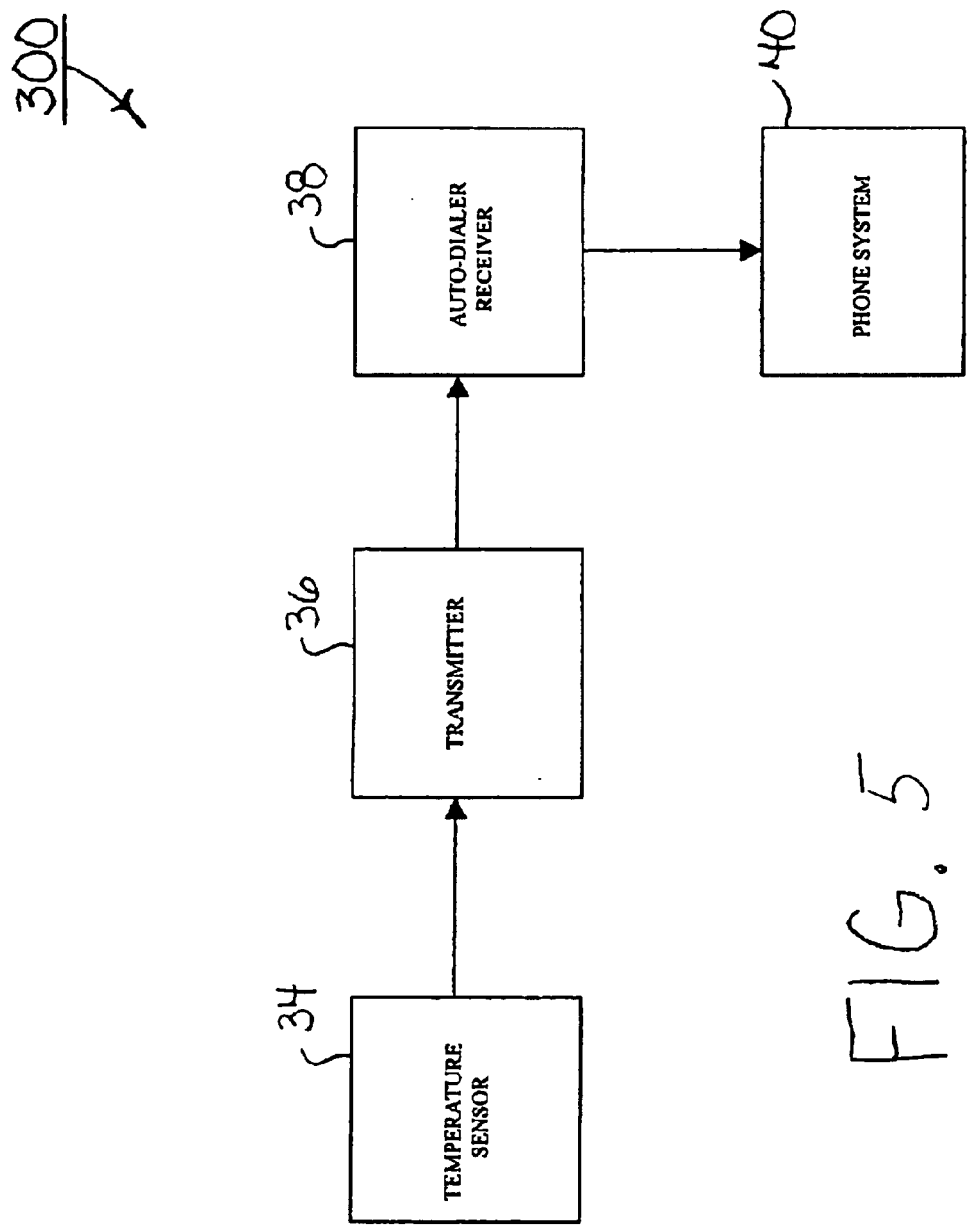
FIG. 5 is a block diagram of a third embodiment of a building protection system according to principles of the present invention.

Referring now to FIG. 5, a third embodiment of a building protection system according to principles of the present invention is shown. The system 300 depicted in this figure is similar to the system 200 in that it includes a transmitter 36 and auto-dialer receiver 38 connected to a phone system 40. With this embodiment, the input to the transmitter 36 is effected by a temperature sensor 34 disposed within the building. This particular embodiment has its primary application as a sort of "early warning" or preventative system for the water utility to a building. One of the most common causes of water leaks in a residence is a pipe burst by freezing water. When a homeowner leaves for a winter vacation, it is presumed that the house heating system will work properly to keep the temperature of the house above freezing. However, if for some reason the heating system fails to operate, the house temperature will normalize at the ambient temperature, which may be below freezing.

Thus, the system 300 contemplates a temperature sensor situated within the house or building. Since the actual temperature of the house is generally immaterial, the sensor can simply constitute an on-off switch, that switches on when the temperature drops below a predetermined threshold. Preferably, the temperature set-point is above freezing, such as 38–40°, so that the auto-dial alert can occur well in advance of the potential for freezing water in the building pipes. As with the system 200, the auto-dialer receiver can incorporate a dialing list, can send a pre-determined message, and can require a confirmatory response before proceeding to the next phone number on the list.

The system 300 of FIG. 5 has particular application to situations in which some water supply must be maintained to the building. Another application is for a second or vacation home in a cold climate. Alternatively, the temperature sensor can be limited to a part of the building susceptible to freezing, such as a basement, even when the building is occupied. The same protocol can be followed to alert the homeowner to a potential problem.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A building protection system for controlling the flow of a utility, such as water or gas, through an inlet line into a building, comprising:

a valve disposed in the inlet line and having an open position permitting flow of the utility into the building and a closed position preventing flow of the utility into the building, said valve responsive to an electrical signal to move between said open and said closed positions;

a manual switch having a first state corresponding to said open position of said valve and a second state corresponding to said closed position of said valve, said switch operable to generate a state signal corresponding to the state of said switch;

a wireless transmitter connected to said manual switch and configured to receive said state signal and to generate a transmitted signal corresponding to said state signal, said transmitter being positioned remote from said valve; and a wireless receiver operably associated with said valve and configured to receive said transmitted signal and to generate said electrical signal in relation to said transmitted signal.

2. The building protection system according to claim 1, wherein said switch and said transmitter is mounted in a hand-held remote control unit.

3. The building protection system according to claim 1, wherein said switch is a wall-mounted switch.

4. The building protection system according to claim 1, wherein said wireless receiver is disposed proximate said valve.

5. The building protection system according to claim 1, wherein said valve is a latching valve.

6. The building protection system according to claim 1, further comprising:

a sensing switch connected to said transmitter and operable to generate a sensing signal in response to sensing a leak of the utility in the building; and said transmitter is configured to generate said transmitted signal in response to said sensing signal.

7. The building protection system according to claim 6, wherein said sensing switch is a water sensing switch.

8. The building protection system according to claim 6, wherein said sensing switch is a gas sensing switch.

9. The building protection system according to claim 1, further comprising:

a plurality of sensing switches connected to said transmitter and operable to generate a plurality of sensing signals in response to sensing a leak of the utility in proximity of the switch; and said transmitter is configured to generate said transmitted signal in response to receipt of one of said plurality of said sensing signals.

10. The building protection system according to claim 1, further comprising an auto-dialer associated with said receiver and connected to a phone system, said auto-dialer configured to automatically dial a stored phone number in response to receipt of said transmitted signal by said receiver.

11. The building protection system according to claim 10, wherein said auto-dialer is operable to convey a pre-determined message through the phone system.

12. A building protection system for controlling the flow of a utility, such as water or gas, through an inlet line into a building, comprising:

a valve disposed in the inlet line and having an open position permitting flow of the utility into the building and a closed position preventing flow of the utility into the building, said valve responsive to an electrical signal to move between said open and said closed positions;

a sensing switch operable to generate a sensing signal in response to sensing a leak of the utility in the building;

a temperature sensing switch operable to generate a temperature sensing signal when the sensed temperature falls outside a pre-determined limit value;

a wireless transmitter connected to said sensing switch and said temperature sensing switch and configured to generate a transmitted signal corresponding to said sensing signal and said temperature sensing signal, said transmitter being positioned remote from said valve; and a wireless receiver operably associated with said valve and configured to receive said transmitted signal and to generate said electrical signal in relation to said transmitted signal; and an auto-dialer associated with said receiver and connected to a phone system, said auto-dialer configured to automatically dial a stored phone number in response to receipt of said transmitted signal by said receiver.

13. The building protection system according to claim 12, wherein said sensing switch is a water sensing switch.

14. The building protection system according to claim 12, wherein said sensing switch is a gas sensing switch.

15. The building protection system according to claim 12, comprising:

a plurality of sensing switches connected to said transmitter and operable to generate a plurality of sensing signals in response to sensing a leak of the utility in proximity of the switch; and said transmitter is configured to generate said transmitted signal in response to receipt of one of said plurality of said sensing signals.

16. The building protection system according to claim 12, wherein said auto-dialer is operable to convey a pre-determined message through the phone system.

* * * * *

UNITED STATES PATENT AND TRADEMARK OFFICE
CERTIFICATE OF CORRECTION

PATENT NO. : 6,892,751 B2
DATED : May 17, 2005
INVENTOR(S) : Mark Sanders

It is certified that error appears in the above-identified patent and that said Letters Patent is hereby corrected as shown below:

Column 5,
Line 66, replace "81" with -- S1 --.

Column 6,
Line 38, replace "KS" with -- K5 --.

Signed and Sealed this

Fifteenth Day of November, 2005

JON W. DUDAS
*Director of the United States Patent and Trademark Office*